(12) United States Patent
Cattani et al.

(10) Patent No.: US 8,201,544 B2
(45) Date of Patent: Jun. 19, 2012

(54) TURBOCHARGER WITH INTEGRATED CENTRIFUGAL BREATHER

(75) Inventors: Luis Carlos Cattani, Aurora, IL (US); Paul Gottemoller, Palos Park, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 477 days.

(21) Appl. No.: 12/511,502

(22) Filed: Jul. 29, 2009

(65) Prior Publication Data

US 2011/0023849 A1    Feb. 3, 2011

(51) Int. Cl.
*F02B 25/06* (2006.01)
(52) U.S. Cl. .................................................. 123/572
(58) Field of Classification Search .......... 123/572–574, 123/41.86
See application file for complete search history.

(56) References Cited

U.S. PATENT DOCUMENTS

| | | | |
|---|---|---|---|
| 6,152,120 A * | 11/2000 | Julazadeh | 123/572 |
| 6,925,993 B1 * | 8/2005 | Eliasson et al. | 123/572 |
| 6,935,315 B2 | 8/2005 | Seymour, II | |
| 7,185,643 B2 | 3/2007 | Gronberg | |
| 7,258,097 B1 | 8/2007 | Snyder | |
| 2002/0046743 A1 * | 4/2002 | Moren | 123/572 |
| 2003/0140909 A1 * | 7/2003 | Criddle et al. | 123/572 |
| 2003/0178014 A1 * | 9/2003 | Sauter et al. | 123/572 |
| 2006/0048761 A1 * | 3/2006 | Ekeroth et al. | 123/572 |
| 2006/0081229 A1 | 4/2006 | Gronberg | |
| 2010/0043734 A1 * | 2/2010 | Holzmann et al. | 123/41.86 |

* cited by examiner

*Primary Examiner* — Marguerite McMahon
(74) *Attorney, Agent, or Firm* — Mark C. Bach; Jeffrey P. Calfa

(57) ABSTRACT

A breather system for a crankcase of an internal combustion engine, includes a centrifuge driven by the engine turbocharger. The turbocharger has a turbine and a compressor, the compressor driven by the turbine. The centrifuge is driven by the turbine on a common shaft with the compressor and includes a centrifuge inlet, a gas outlet and an oil outlet. Crankcase gas is delivered to the centrifuge and oil is removed by the centrifuge and collected within the turbocharger housing and substantially oil free gas is passed through the centrifuge, through an axially passage in the shaft and into an inlet of the compressor.

15 Claims, 3 Drawing Sheets

TURBOCHARGER WITH INTEGRATED CENTRIFUGAL BREATHER

FIELD OF THE INVENTION

This invention relates to internal combustion engines, including but not limited to recirculation of crankcase gases into the intake system of an engine.

BACKGROUND

The present invention relates to a breather system for a crankcase of an internal combustion engine of the type which recirculates piston blow-by gases in the crankcase to the intake air line of an engine to eliminate the discharge of oil mist into the environment.

Ideally, the pressure within an internal combustion engine crankcase should be maintained at a level equal to or slightly less than atmospheric pressure to prevent external oil leakage through the various gasketed joints, such as that between the valve cover and the cylinder head. Combustion gases are generated during the operation of an internal combustion engine. A small amount of these gases leaks past the piston seals of the internal combustion engine, and unless the gases are removed from the crankcase, they become trapped. These gases, commonly referred to in the art as "blow-by" gases, need to be released. Because of the "blow-by" gases, the crankcase pressure will inherently rise, promoting leakage of oil from the crankcase. Originally, crankcase pressure was vented to the atmosphere through a breather to solve this problem.

Environmental considerations dictate that the blow-by gases in the crankcase be vented back to the combustion chamber rather than being released to the atmosphere. Accordingly, the crankcase was scavenged by being connected to the engine air intake thereby resulting in a vacuum in the crankcase with a depression valve being used to prevent the negative pressure in the engine cavity from exceeding a predetermined amount.

Some efficient engine breather systems incorporate a centrifuge. These systems require a drive which is typically a high-speed motor or an oil jet directed at a wheel. Durability and service life are important considerations for these devices as they are operated at rotating speeds above 10,000 rpm. Furthermore, these devices require dedicated space within an engine compartment for mounting and supporting hardware.

The present inventors have recognized that it would be desirable to provide a durable breather system that did not require significant additional space within an engine compartment.

SUMMARY

An exemplary embodiment of the invention combines a centrifuge-type crankcase breather with a turbocharger.

According to an exemplary embodiment, a breather system for a crankcase of an internal combustion engine, includes:

a turbocharger having a turbine and a compressor, the compressor driven by the turbine, the compressor pressurizing intake air delivered to the internal combustion engine, the turbine driven by exhaust gas from the internal combustion engine;

a centrifuge driven by the turbine and having a centrifuge inlet, a gas outlet and an oil outlet;

an inlet conduit connecting the crankcase to deliver crankcase gas to the centrifuge inlet; and an outlet conduit connecting the gas outlet to the turbocharger compressor.

The turbine comprises a turbine wheel within a turbine housing, and the compressor comprises a compressor wheel within a compressor housing. The turbine wheel and the compressor wheel rotate on a common shaft. The centrifuge is fixedly mounted on the common shaft between the turbine wheel and the compressor wheel. The outlet conduit is located within the common shaft.

The centrifuge comprises centrifuge plates enclosed by a housing having holes.

An exemplary method includes the steps of:

providing a centrifuge for separating oil from crankcase gas;

providing a turbine wheel and driving the turbine wheel by exhaust gas flow from the internal combustion engine;

driving the centrifuge to rotate by rotational energy from the turbine wheel; and delivering the crankcase gas from the centrifuge to an air intake of the internal combustion engine.

The method can include the further step of providing a compressor having an air input and a compressed air output delivered to the air intake of the internal combustion engine, wherein the compressor is driven by the turbine wheel; and delivering the crankcase gas to the air input of the compressor.

Because turbochargers operate at high rotational speeds, such as 100,000 rpm, efficiency of the oil separation by the centrifuge can be significantly improved.

Because the total air pressure at the compressor inlet drives the system and not compressor inlet static pressure, the variation of crankcase pressure can be minimized.

Additionally, ice buildup on the breather pipe as it enters the air inlet pipe before the turbocharger compressor is obviated because the breather pipe can be arranged in close proximity to the compressor. Because the centrifuge is integrated with the turbocharger, the bearing life for the centrifuge will be that of the turbocharger. The integration of the centrifuge with the turbocharger also requires very little if any allotted space in the engine compartment.

A source of crankcase gas from an engine compartment, such as from the valve cover, the front cover, the oil pan, etc., is connected by a conduit to a turbocharger inlet. From the inlet the crankcase gas axially enters the centrifuge housing.

Centrifuge plates have openings near the center that allow the crankcase gas to move along the axis of the turbine wheel toward the compressor. The centrifuge spins at the speed of the turbocharger and can be made smaller since the rotating speed are about 10 times that of the commercial centrifuge-type breathers.

The whole breather housing and centrifuge plates mounted therein rotate together with the turbine wheel so as the crankcase gas passes through the centrifuge the oil is slung to the outside and sprayed out slots.

The substantially oil free crankcase gas passes through the center of the compressor shaft and out to the end of the shaft. The driving suction at this point is equal to the total pressure and dependent on the air filter depression and the losses in the system. Typically, this would run between negative 5 and negative 15 inches of water which is an acceptable level for crankcase vacuum. If necessary, the driving suction can be made more negative by making the compressor outlet more radial. A straight radial outlet is the definition of the static pressure which can be as high as negative 40 inches of water.

Numerous other advantages and features of the present invention will be become readily apparent from the following detailed description of the invention and the embodiments thereof, from the claims and from the accompanying drawings.

DETAILED DESCRIPTION

Figure 1:
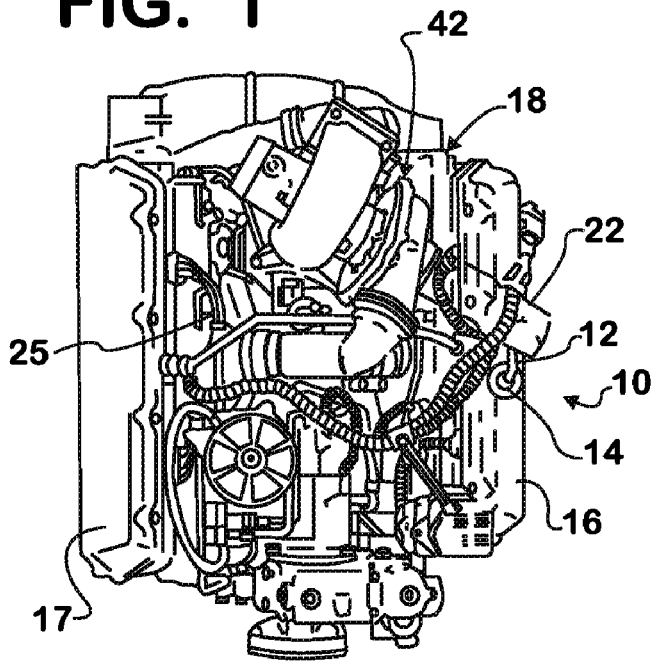
FIG. 1 is a plan view of a turbocharged engine and shows schematically a crankcase breather system of the present invention engaged to and between a valve housing of the engine and the compressor air inlet line of a FIG. 2 is an enlarged, fragmentary sectional view of the turbocharger of FIG. 1.
Figure 3:
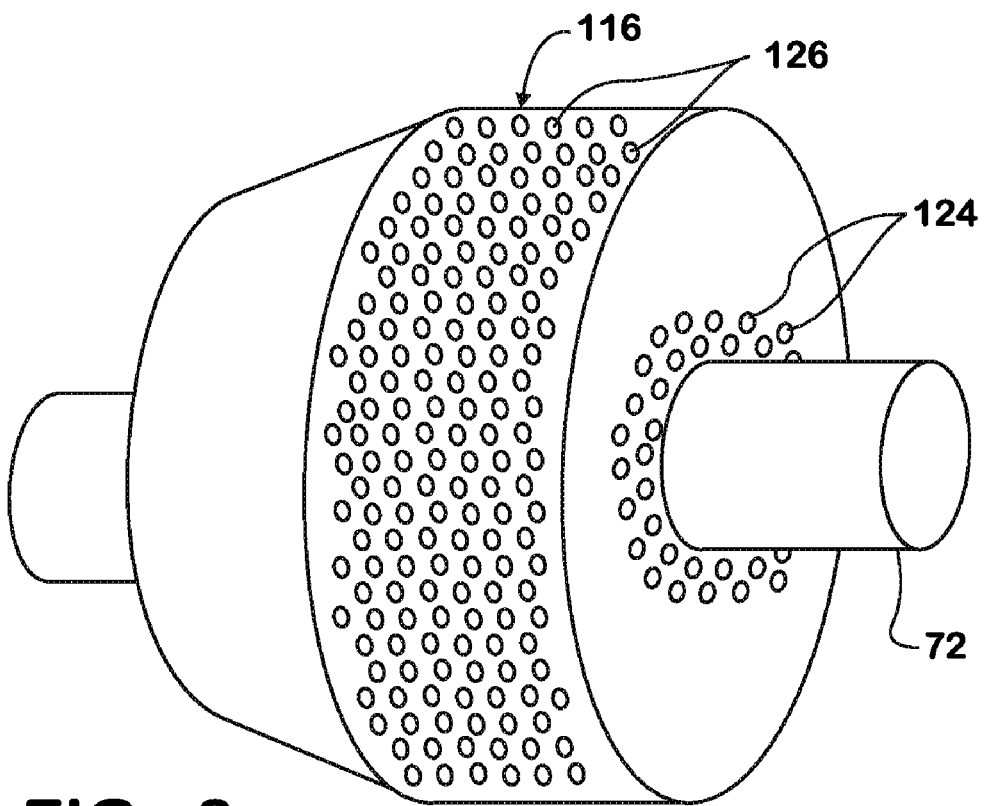
FIG. 3 is an enlarged perspective view of the centrifuge taken from FIG. 2.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Referring now to the drawings in greater detail, there is illustrated therein an integrated turbocharger crankcase breather system of the present invention generally identified by the reference numeral 10 mounted on an internal combustion engine 18, preferably a diesel engine.

The breather system 10 comprises a breather conduit 12 having an inlet end 14 in fluid communication with the interior of a valve housing or rocker arm cover 16 of engine 18 and an outlet end 20 (FIG. 2) in fluid communication with a turbocharger 42 as described below. The term "conduit" used herein should be understand to incorporate tubes, pipes, passages and any other path that can direct or channel fluids, such as gases or liquids, between two locations.

In a V-8 engine, such as shown in FIG. 1, a crossover tube 25 interconnects the valve housing 16 with the rocker arm cover 17 of the other bank of the engine to equalize the pressure throughout the engine. It will be understood that the rocker arm cover 16 defines a portion of a closed interior cavity of the engine and that there is a continuous internal air path existing within and between the crankcase and the rocker arm cover 16. Thus, venting of the valve housing 16 will necessarily vent the interior of the crankcase as well as valve housing 17.

Figure 2:
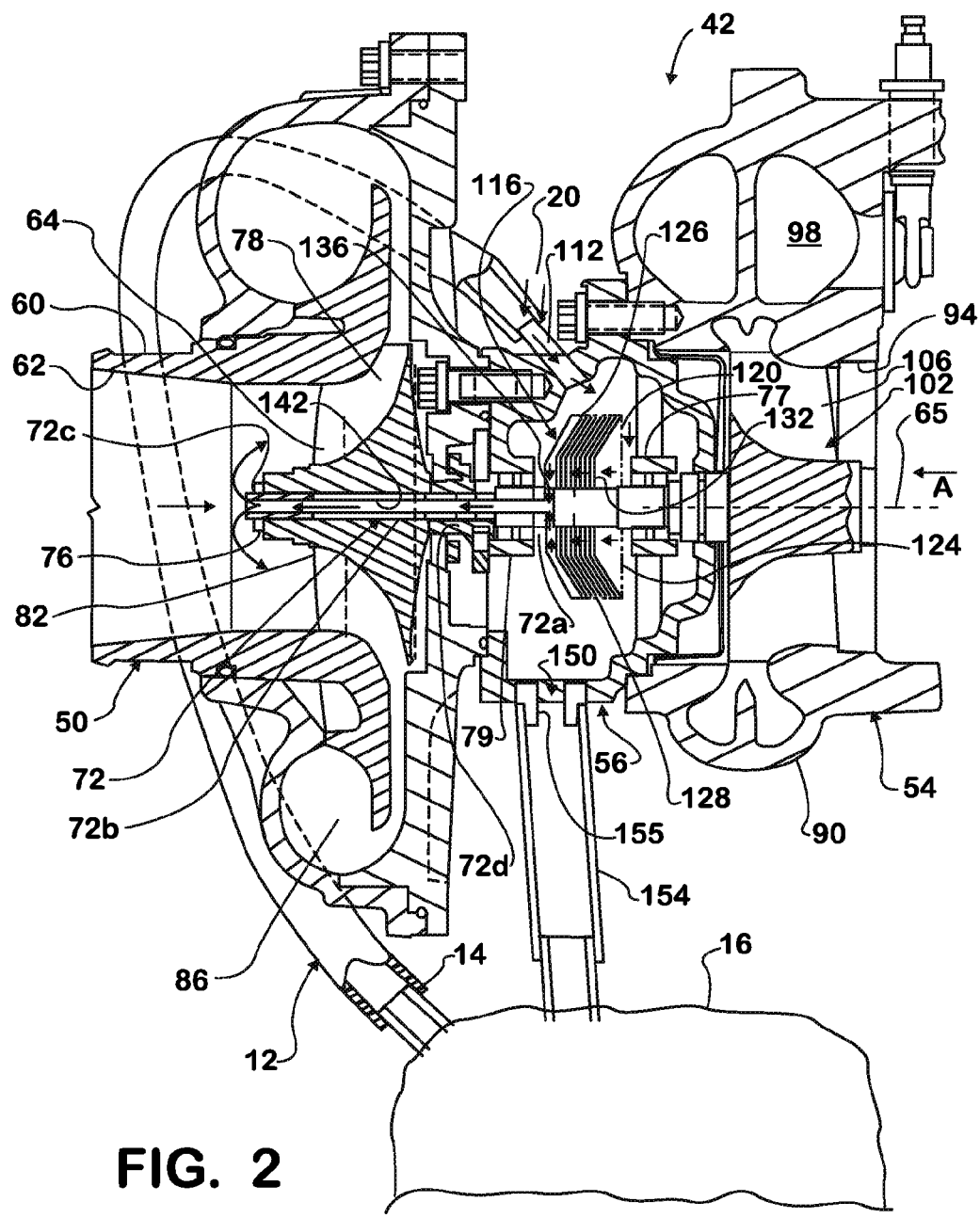

FIG. 2 shows the turbocharger 42 in accordance with one embodiment of the invention. The turbocharger 42 includes a compressor 50, a turbine 54, and a center housing 56. The compressor 50 includes a compressor housing 60 that defines an axially extending air inlet 62 through which air to be compressed is received into the compressor assembly. A compressor wheel 64 is mounted within the compressor housing 60. The compressor wheel 64 is rotatable about a central longitudinal axis 65 of the turbocharger. The compressor wheel 64 is mounted on one end of a rotatable shaft 72 that extends longitudinally through the center housing 56.

The shaft 72 comprises a two-part assembly having stepped shaft part and a shaft sleeve. The stepped shaft part defines a larger-diameter portion 72a adjacent to and joined with the turbine wheel and a smaller-diameter portion 72b joined to the larger-diameter portion and extending through a central bore in the compressor wheel 64. An end 72c of the smaller-diameter portion is threaded and a nut 76 is threaded onto the end to secure the compressor wheel. The shaft sleeve 72d is press-fit about the smaller-diameter portion 72b and has an outer diameter about equal to that of the larger-diameter portion 72a. The shaft 72 is journalled for rotation by two bearings 77, 79. A thrust bearing and seals are provided in the turbocharger as known.

The compressor wheel 64 includes a plurality of compressor blades 78. The compressor housing 60 and the compressor wheel 64 define a flow path therebetween, and the blades 78 occupy the flow path. The flow path is oriented generally axially at an upstream side of the compressor wheel, and then turns radially outwardly so that it extends generally radially outwardly at a downstream side of the wheel adjacent the trailing edges of the blades 78. Air is drawn through an inlet 82 into the row of blades 78 and is compressed as it travels along the flow path through the compressor. The compressed air is discharged radially outwardly into a generally annular volute 86 defined by the compressor housing 60. From the volute 86, the compressed air is supplied via a discharge pipe (not shown) to the engine air intake duct.

The turbine 54 includes a turbine housing 90 that defines a central bore 94 therethrough. The turbine housing 90 also defines a generally annular volute or chamber 98 that surrounds the central bore 94 and opens into the bore at a radially inner side of the chamber. Mounted on the opposite end of the shaft 72 from the compressor wheel 64 is a turbine wheel 102 that supports a plurality of turbine blades 106. In a typical installation of the turbocharger, hot exhaust gas from the engine is supplied via a suitable exhaust duct system into the chamber 98. The exhaust gas flows generally radially inwardly (although it can also have an axial component) from the chamber into the row of turbine blades 106, which are appropriately shaped so that the turbine wheel 102 is rotatably driven by the exhaust gas. Rotational power generated by the turbine wheel is used to drive the compressor wheel via the shaft.

The center housing 56 has a central bore therethrough, coaxially arranged with respect to the rotational axis of the compressor wheel.

The outlet 20 of the breather conduit 12 is connected between the valve housing 16 and an inlet 112 to the center housing 56.

A centrifugal oil separator or centrifuge 116 is fixedly mounted on the shaft 72 within the center housing 56. Such centrifuges are known and can be as described and explained in U.S. Pat. Nos. 7,338,546; 7,152,589; 6,973,925, herein incorporated by reference.

The centrifuge 116 includes a cylindrical, substantially enclosed housing 120 having axial gas inlet holes 124 through one end wall and radial oil holes 126 on a circumference thereof for removal of oil drops. Stacked, spaced-apart centrifuge discs or plates 128 are mounted within the centrifuge housing 120. The centrifuge housing 120 and the plates 128 are fixedly mounted on the shaft 72 by being press fit thereon, or keyed thereon, or by another known method. The plates 128 include axial gas holes 132 for the passage of gas in an axial direction "A". The centrifuge plates 128 allow gas to pass axially to beyond the centrifuge plates 128 to radial holes 136 in the shaft 72. The shaft 72 includes a center, axial passage 142 for removal of substantially oil free gas from the center housing 56 to the inlet 82 of the compressor. By centrifugal force, oil from oil mist contained in the crankcase gas is delivered through the radial oil holes 126 of the centrifuge housing 120 and collects within the center housing 56 and is removed through an oil drain hole 150. An oil drain conduit 154 is connected between the center housing 56 to the valve housing 16 or other part of the crankcase, connected by a fitting 155 fit into or over the drain hole 150.

If the oil drain hole 150 and the oil drain conduit 154 have sufficiently large diameter to the point that the drain conduit would never completely fill with oil, it is possible that both the gas inlet and the oil drain could be accomplished through a single conduit wherein gas would pass from the crankcase to the center housing in one direction and oil would drain from the center housing in an opposite direction, both within the same conduit. This being the case, the breather conduit 12 could be eliminated and the conduit 154 can serve as both the breather conduit and the oil drain conduit.

Figure 4:
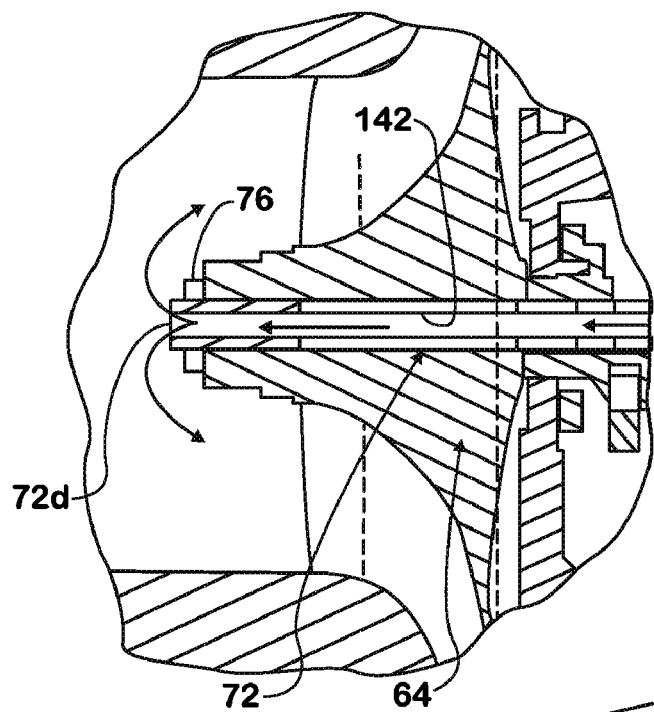
FIG. 4 is an enlarged, fragmentary sectional view taken from FIG. 2.

After the oil mist or oil drops are removed by the spinning centrifuge, the now substantially oil free crankcase gas passes through the passage 142 of the shaft 72 and out of an end hole 72e of the shaft as shown in enlarged FIG. 4. The driving suction of the compressor at this point is equal to the total pressure and is dependent on the air filter pressure drop or depression and the pressure drops or losses in the system. Typically, this would run between negative 5 and negative 15 inches of water which is an acceptable level for crankcase vacuum.

Figure 5:
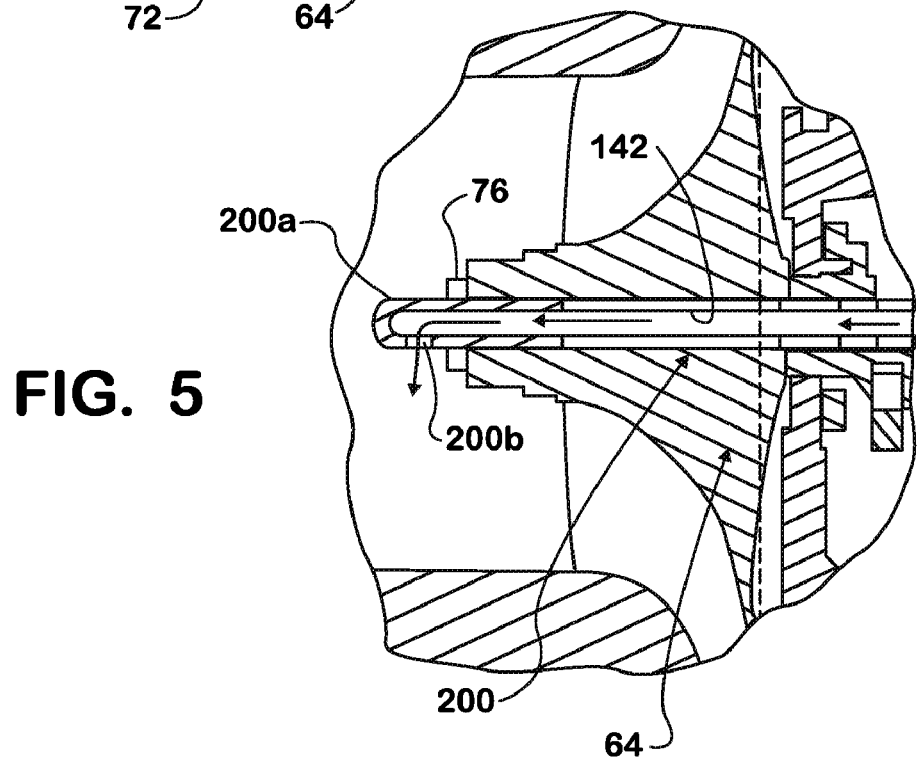
FIG. 5 is an enlarged, fragmentary sectional view similar to FIG. 4 of an alternate embodiment of the invention.

As shown in FIG. 5, the shaft 72 is replaced by a shaft 200 that is only different at a gas discharge end thereof. An end 200a of the shaft 200 is capped and one or more radial holes 200b are formed through an exposed portion of the shaft. This driving suction can thus be made more negative by making the compressor outlet radial. A 90 degree radial hole 200b as shown, is the definition of the static pressure which can be as high as negative 40 inches of water. Holes having angles between the 180 degree angle of FIG. 4 and the 90 degree or radial angle of FIG. 5 are also encompassed by the invention. The angle can be suited to the desired static pressure of the oil-cleaned gas discharge at the shaft end hole 72d or 200b.

One advantage of the configuration of FIG. 5 concerns ice build up. Water vapor can constitute a portion of the crankcase gases. The water vapor can condense into ice pieces that can damage the rotating compressor wheel upon impact. Because the holes 72e and radial hole 200b enter the air stream as close to the compressor wheel as possible, the ice buildup is minimized (time is reduced). Also, if ice does collect on the end of the compressor wheel, the damage when the ice breaks loose is minimized because the relative velocity between the wheel and the ice is minimized.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A breather system for a crankcase of an internal combustion engine, comprising:
   a turbocharger having a turbine and a compressor, the compressor driven by the turbine, the compressor pressurizing intake air delivered to the internal combustion engine, the turbine driven by exhaust gas from the internal combustion engine;
   a centrifuge driven by the turbine and having a centrifuge inlet, a centrifuge gas outlet and a centrifuge oil outlet;
   an inlet conduit connecting the crankcase to deliver crankcase gas to the centrifuge inlet; and
   a centrifuge gas outlet conduit fluidly connecting the centrifuge gas outlet to a compressor inlet of the turbocharger compressor, wherein the turbine comprises a turbine wheel within a turbine housing, and the compressor comprises a compressor wheel within a compressor housing, the turbine wheel and compressor wheel rotate on a common shaft, and the centrifuge is fixedly mounted on the common shaft between the turbine wheel and the compressor wheel, and the centrifuge gas outlet conduit is located within the common shaft.

2. The system according to claim 1, wherein the centrifuge comprises centrifuge plates enclosed by a housing having side wall holes.

3. The system according to claim 1, wherein the turbine comprises a turbine wheel within a turbine housing, and the compressor comprises a compressor wheel within a compressor housing, the turbine wheel and compressor wheel rotate together on a common shaft, and the centrifuge is mounted on the common shaft to rotate with the turbine wheel.

4. The system according to claim 1, wherein the crankcase gas conduit is arranged and oriented to also drain the oil from the centrifuge oil outlet back to the crankcase.

5. The system according to claim 1, wherein the turbine comprises a turbine wheel within a turbine housing, and the compressor comprises a compressor wheel within a compressor housing, the turbine wheel and compressor wheel rotate on a common shaft, and the centrifuge is fixedly mounted on the common shaft, and the centrifuge gas outlet conduit extends axially along the common shaft and includes an outlet hole having an open face perpendicular to the axis of the shaft, gas exiting the outlet hole in an axial direction.

6. The system according to claim 5, wherein the centrifuge gas outlet conduit is at least partially within the shaft.

7. The system according to claim 1, wherein the turbine comprises a turbine wheel within a turbine housing, and the compressor comprises a compressor wheel within a compressor housing, the turbine wheel and compressor wheel rotate on a common shaft, and the centrifuge is fixedly mounted on the common shaft, and the centrifuge gas outlet conduit extends axially along the common shaft and includes an outlet hole having an open face parallel to the axis of the shaft, gas exiting the outlet hole in a radial direction.

8. The system according to claim 7, wherein the centrifuge gas outlet conduit is at least partially within the shaft.

9. The system according to claim 1, wherein the centrifuge is fixedly mounted on the shaft, and the centrifuge gas outlet conduit extends axially along the common shaft and includes an outlet hole having an open face parallel to the axis of the shaft, gas exiting the outlet hole in a radial direction.

10. The system according to claim 9, wherein the centrifuge gas outlet conduit is at least partially within the shaft.

11. An internal combustion engine comprising:
   an engine crankcase having cylinders and a crankcase gas outlet;
   an air intake manifold and a fuel delivery into the cylinders;
   an exhaust conduit receiving exhaust gas from the cylinders;
   a turbine connected to the exhaust conduit, the turbine having a turbine wheel driven into rotation by the exhaust gas flowing from the conduit;
   a compressor having a compressor wheel within a compressor housing, the compressor wheel connected by a shaft to the turbine wheel to rotate therewith, the compressor housing having an air inlet and an air outlet flow connected to the air intake manifold to deliver pressurized air into the air intake manifold;
   a centrifuge connected to the shaft, the centrifuge having a crankcase gas inlet, a centrifuge gas outlet and a centrifuge oil outlet; and
   a centrifuge outlet conduit connecting the centrifuge gas outlet with the air inlet of the compressor housing; and a crankcase gas conduit connecting the crankcase gas outlet to the crankcase gas inlet, wherein the centrifuge outlet conduit is formed within the shaft.

12. The engine according to claim 11, wherein the centrifuge is located between the turbine wheel and the compressor wheel.

13. The engine according to claim 11, wherein the crankcase gas conduit is arranged and oriented to also drain the oil from the centrifuge oil outlet back to the crankcase.

14. The system according to claim 11, wherein the centrifuge is fixedly mounted on the shaft, and the centrifuge gas outlet conduit extends axially along the shaft and includes an outlet hole having an open face perpendicular to the axis of the shaft, gas exiting the outlet hole in an axial direction.

15. The system according to claim 14, wherein the centrifuge gas outlet conduit is at least partially within the shaft.

* * * * *